INVENTOR.
GORDON L. CANN
BY Joseph J. Rosenthal

INVENTOR.
GORDON L. CANN
BY Joseph J. Rosenthal

INVENTOR.
GORDON L. CANN
BY Joseph J. Rosenthal

United States Patent Office 3,452,249
Patented June 24, 1969

3,452,249
METHOD AND APPARATUS FOR CONTAINING A PLASMA PRODUCED BY OPPOSED ELECTRODES
Gordon L. Cann, Laguna Beach, Calif., assignor to Electro-Optical Systems, Inc., Pasadena, Calif., a corporation of California
Filed May 21, 1965, Ser. No. 457,746
Int. Cl. H01j 7/24, 17/26; H05b 31/26
U.S. Cl. 315—111    9 Claims

ABSTRACT OF THE DISCLOSURE

A method and apparatus for electromagnetically containing a body of high temperature plasma is disclosed. The containment of the plasma is obtained by establishing a continuous longitudinal magnetic field within which two or more opposed plasma producing electrodes are provided and maintaining a radially inward electric field within the plasma for ion confinement.

---

This application relates to methods and apparatus for plasma containment.

There are many situations where it is desirable to produce sustained high temperatures greatly in excess of the melting point of structural materials. These include the spectroscopic investigation of atomic structure, routine spectroscopic analysis, the study of chemical reactions, the generation of neutrons and the study or utilization of thermonuclear reactions. Known or contemplated methods of producing extra high temperatures involve the generation of such temperatures in a body of plasma, which is a body of highly ionized electrically neutral gas having a very high electrical conductivity. The electrical properties of a plasma make it theoretically possible to effect containment by means of magnetic fields rather than by physical contact with the walls of a container. The absence of such contact makes the containment possible at temperatures far above the melting points of all structural materials and without excessive heat losses to such containers. Many magnetic containment schemes have been proposed; some involve a transient or pulse type of operation while others are steady-state but require complex starting procedures. Prior methods involve the use of complex apparatus and have not been outstandingly successful in operation.

It is accordingly an object of the invention to provide a plasma containment and heating method which is simple, capable of steady-state operation, capable of small scale operation, requires no complex starting procedures, and is effective. It is a further object of the invention to provide a plasma containment and heating method which is electrostatic as well as magnetic in character and which makes use of Hall currents. It is still a further object of the invention to provide simple and effective apparatus for containing and heating a plasma. Further objectives will become apparent upon reading a description of the invention.

Figure 1:
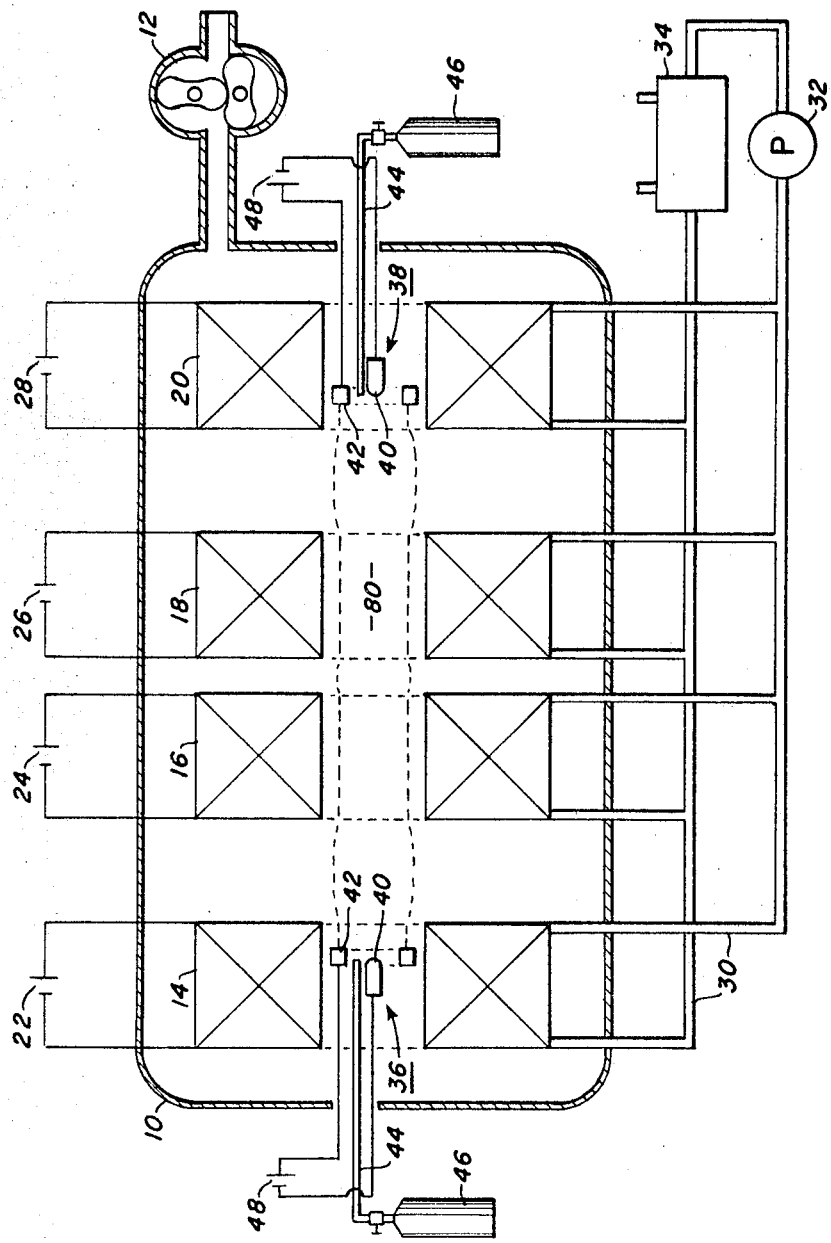
Figure 2:
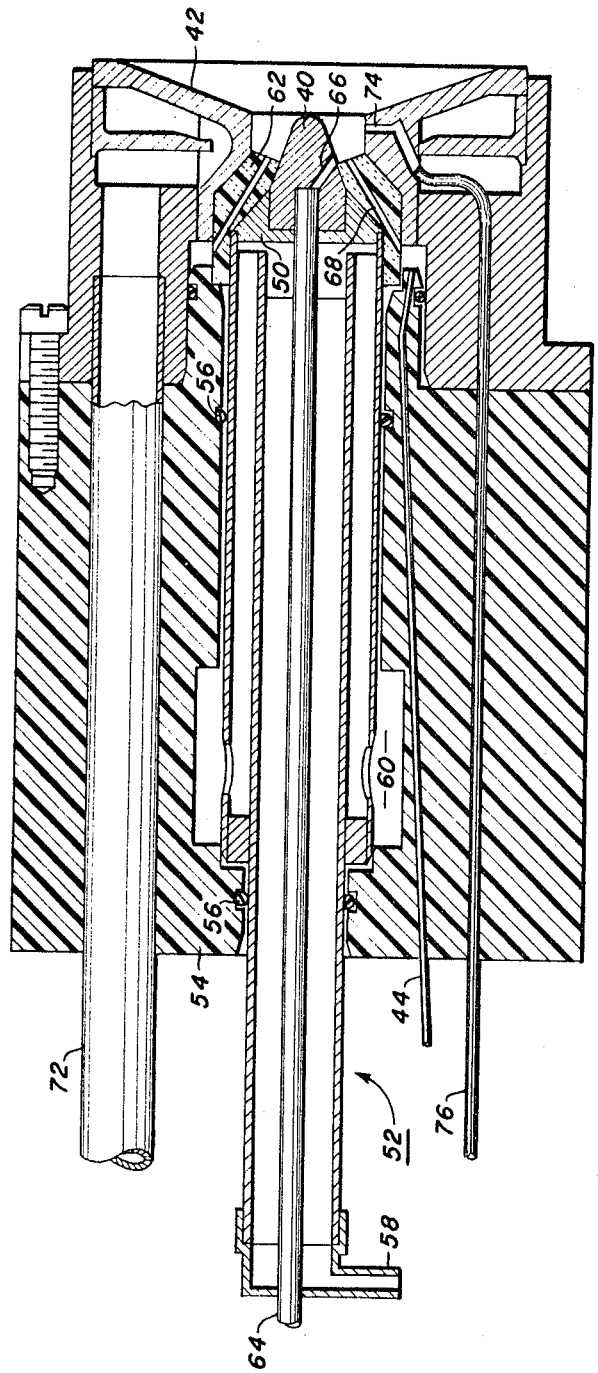
Figure 3:
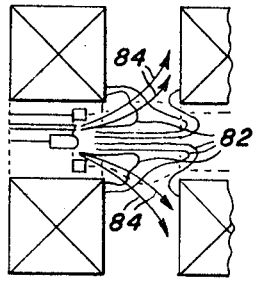
Figure 4:
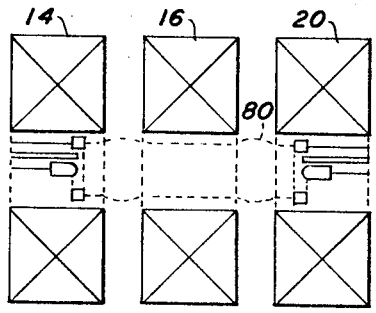
Figure 5:
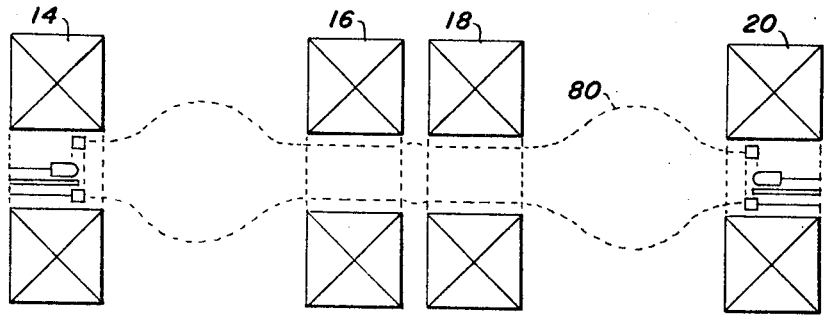
Figure 6:
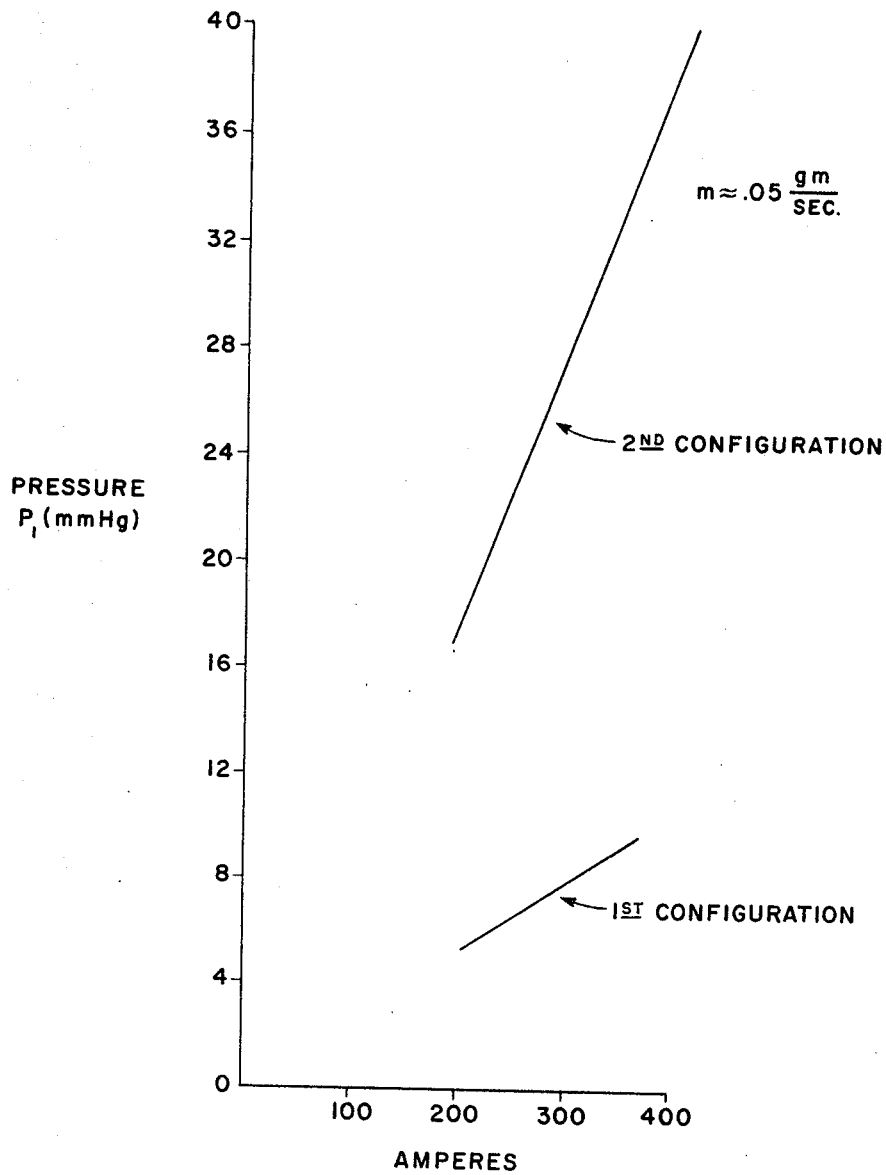
Figure 7:
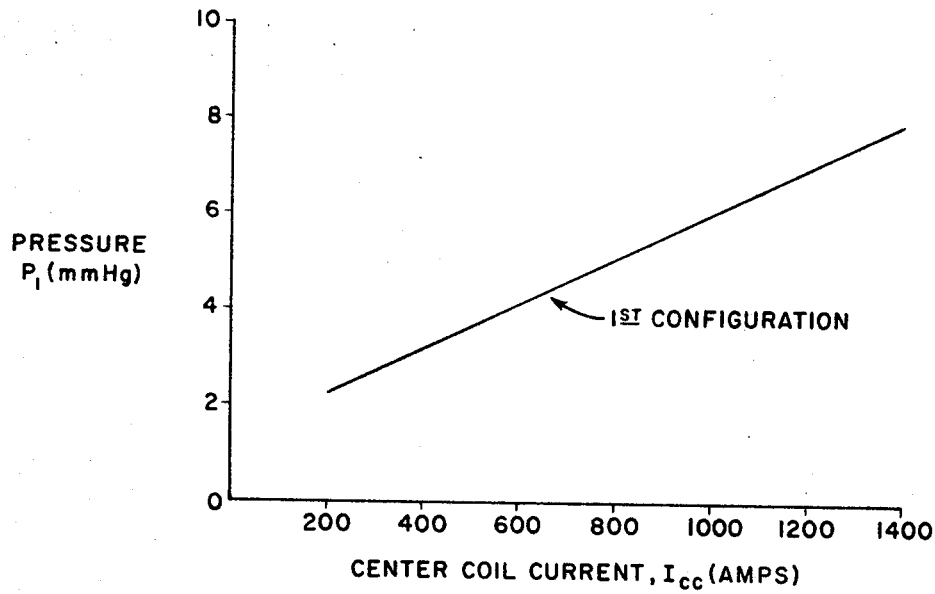
Figure 8:
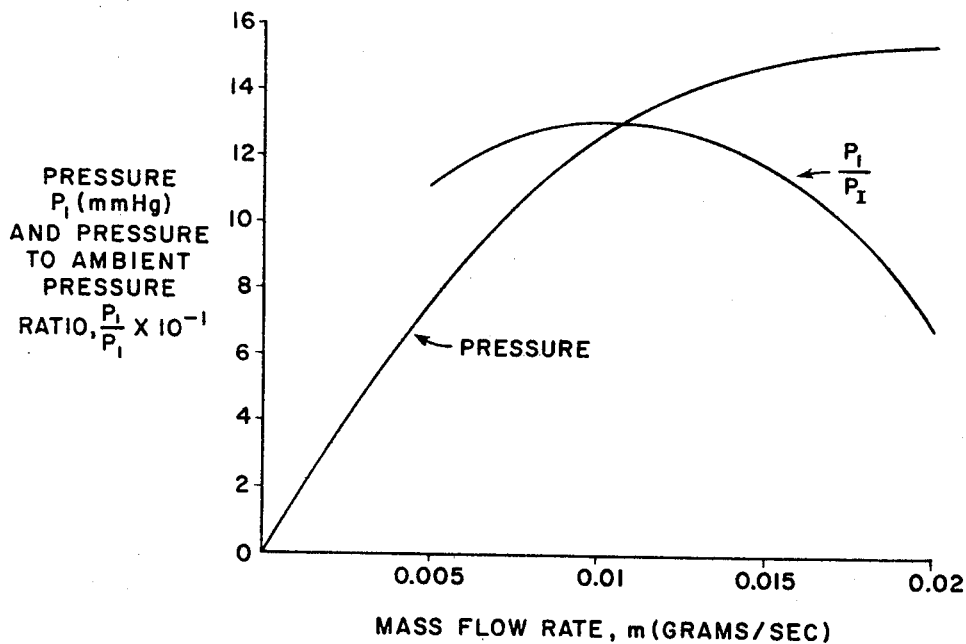
Figure 9:
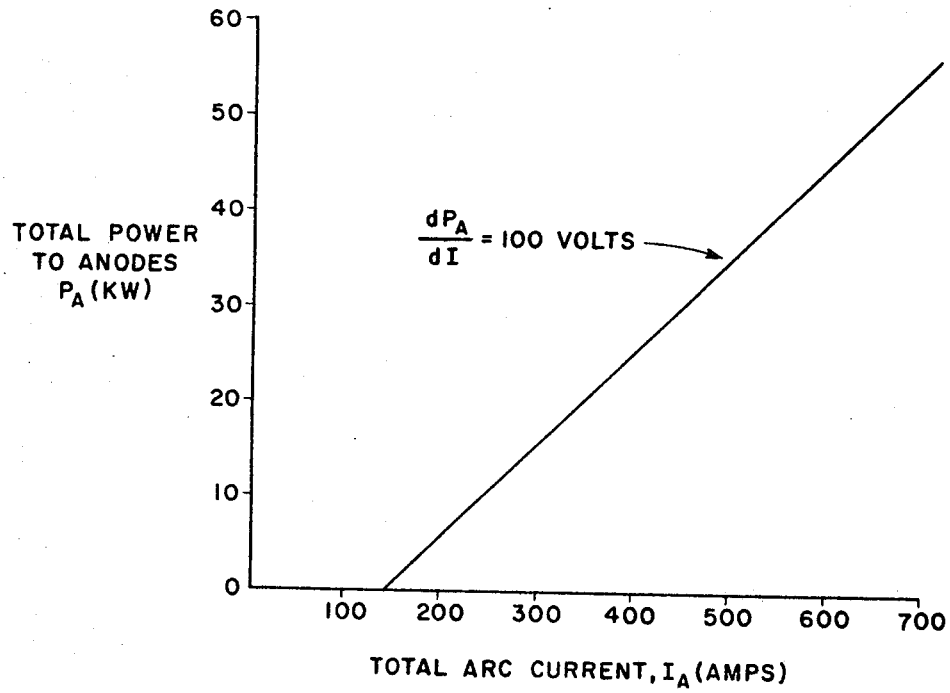

FIGURE 1 is a diagrammatic sectional view of a first embodiment of the invention,
FIGURE 2 is a sectional view of the electrode assembly used in FIGURE 1,
FIGURE 3 is a postulated electron flow pattern,
FIGURE 4 is a sectional view of a 2nd embodiment of the invention,
FIGURE 5 is a sectional view of a 3rd embodiment of the invention,
FIGURE 6 is a graph showing a relation between pressure and arc current,
FIGURE 7 is a graph showing a relation between pressure and coil current,
FIGURE 8 is a graph showing a relation between pressure ratio and mass flow rate,
FIGURE 9 is a graph showing a relation between anode power disposition and arc current.

Referring to FIGURE 1, there is shown an illustrative embodiment of the invention including a chamber 10 which is evacuated by a vacuum pump 12 and which contains a set of coaxial magnet coils 14, 16, 18 and 20. A single long solenoid can be used, but it is more convenient to use a set of individual coils as shown. Each coil 14–20 has an associated high current power supply 22–28 respectively. The coils are fluid cooled and each is provided with coolant tubes 30 through which water or other coolant is circulated by pump 32 which also circulates the coolant through a heat exchanger 34 to remove heat generated in the coils and also heat carried by or generated in the plasma. The resulting magnet field can be substantially uniform in the axial direction or preferably, the field at the end coils can be somewhat larger than in the immediately adjacent region. Chamber 10 can also be located inside the magnet coils if it is constructed of non-magnetic material in order that the external coils may provide the necessary magnetic field within the chamber. Electrode assemblies 36 and 38 are positioned axially within chamber 10 in facing relation. The electrodes are located within the longitudinally continuous field generated by coils 14 to 20 and are preferably located in the vicinity of the end coils 14 and 20. Each electrode assembly includes a tapered or pointed cathode 40 surrounded by a concentric annular anode 42. A gas supply channel 44 introduces a suitable gas such as hydrogen from a source 46 into the space between the cathode and anode and a DC power supply 48 is connected between each cathode and anode. Conventional supporting means, not shown, will be included in chamber 10 to position and support electrode assemblies 36 and 38 and magnet coils 14–20 and conventional electrical and fluid lead-throughs may be used to introduce the necessary electrical currents and gases into and out of chamber 10 without breaking the vacuum therein.

A suitable electrode structure is shown in somewhat greater detail in FIG. 2. Cathode 40 is constructed of tungsten and, like most structures in the figure, will normally be axially symmetric. It is mounted in a metal heat sink 50 which, in turn, is mounted at the end of a cathode support and cooling water conduit 52 which is sealed into phenolic support block 54 by seal rings 56. A cathode cooling water inlet 58 is shown at the back of conduit 52. A cathode cooling water outlet will communicate with a cavity 60 in support block 54 that is out of the plane of the drawing and not shown. It will be understood that various other cooling water passages will not appear in the drawings for the same reason. A boron nitride insulater 62 is mounted on cathode conduit 52 and surrounds cathode 40 while leaving the tip portion exposed. Cathode 40 is bored to receive a hollow tubular pressure tap 64 located within the cathode water conduit 52. Cathode 40 contains one or more small passages 66 which connect the pressure tap 64 to the exterior surface of the cathode forward of the cathode insulator 62 which is itself provided with a gas passage, or preferably a plurality of circumferentially disposed passages 68 which communicate with the front face of the insulator and are connected to a feed tap 44 in support block 54. Either passages 66 or 68 may be used to introduce a fluid to the space adjacent to the cathode, but it is generally preferable to introduce the fluid through passages 68 and to use passages 66 for measuring the pressure adjacent to cathode 40.

A water cooled copper anode assembly 42 is mounted on the support block 54 and is insulated from cathode 40 by insulator 62. The anode has a concave conical outer face and a cylindrical inner surface which joins the outer face along a sharp edge. Illustratively, the diameter of the inner surface is 1.5 centimeters. Anode 42 is connected to an electrically conductive water inlet conduit 72 and to an outlet conduit, not shown. It is also provided with one or more passages 74 which communicate with the inner surface of the anode and are connected to an anode pressure tap 76 which permits measurements of pressures adjacent the anode. Other types of coaxial electrode assemblies may be used and will be understood that the particular size configuration and materials described in FIG. 2 are for illustrative purposes only. It is merely necessary that the central cathode tip be associated with a surrounding ring anode located axially adjacent the cathode tip.

In operation, chamber 10 is evacuated, magnet coils 14 to 20 are energized, a gas is fed from source 46 through channels 44 to electrode assemblies 36 and 38, and power supplies 48 are energized to strike an electrical arc between each cathode 40 and its associated anode 42. A plasma, i.e., positive ions and negative electrons, is thereby generated and fills the space between the two plasma generators. Because of the magnetic field existing therebetween, the plasma electrons are constrained to execute small diameter cyclotron oscillations about the magnetic lines of force. The magnetic field will be chosen in relation to the plasma pressure in accordance with conventional principles so that the electron orbital radius will be substantially less than the plasma column radius and so that the collision deflection mean free path of the electrons will substantially exceed the electron orbital circumference, i.e., $2\pi\omega_e\tau_e$ is very large compared to unity, where $\omega_e$ is the angular cyclotron frequency for electrons and $\tau_e$ is the mean time between electron collisions. This condition is not difficult to achieve in a practical device because the effective collision cross section decreases at high plasma temperatures. Under this condition, as is known in the plasma art, the electric lines of force are essentially constrained to follow the magnetic lines of force. From a macroscopic point of view, a high temperature plasma in a magnetic field exhibits a high degree of electrical conductivity parallel to the magnetic lines of force but a very low degree of conductivity perpendicular to the lines of force. The reality of this effect can readily be demonstrated in the apparatus of FIGURE 1 as will be shown in conjunction with the experimental results to be presented later. In some cases, it is also preferred that for the ions, $\omega_i\tau_i$ be small compared to unity, so that the ion collision mean free path is lower compared to the plasma column radius. This condition is readily obtained in a practical plasma. Also, as high a vacuum as possible should ordinarily be maintained in chamber 10 to minimize heat losses from the plasma.

Under the described conditions, a confined column of plasma 80 is formed between the two electrode assemblies and can be visually observed through portholes in chamber 10. The postulated containment mechanism in the central part of the column can now be simply described. Electrons are confined to orbits about the magnetic lines of force and the ions and electrons are each urged outwards by the radial pressure gradient in the column. The constraining force on the ions is primarily the radial electric field propagated from the electrodes rather than a force associated with the magnetic field. Considering a section taken normal to the axis of the device, it is obvious that the positive ions find themselves in an electrostatic potential well from which they are unable to escape unless they have an energy higher than the potential drop between the axis of the plasma and the outside thereof. This is in marked contrast to most prior schemes of plasma containment and has several favorable consequences. One of these is that the diameter of the containment device and the strength of the magnetic field need not be such as to provide ion orbital radii which are small in comparison to the device radius. It is another consequence of this method of containment that in the part of the plasma column remote from the electrodes there need be no appreciable axial motion. The radial electric field exerts an outward force on the plasma electrons but they cannot move outward except by losing energy in collisons with plasma ions, neutral atoms or other electrons. This is a useful effect since it serves to heat the plasma and particularly the ionic component. The interaction of the radial current flow with the longitudinal magnetic field also creates a rotating Hall current and a plasma rotation which tends to maintain the plasma column in rotation about its axis and to provide confining forces for the electrons because of the interaction between the circumferential Hall current and the axial magnetic field. The Hall current also generates a magnetic field which opposes that of magnets 14–20 within the plasma column.

The situation in the vicinity of the electrode assemblies is somewhat more complex. FIGURE 3 shows postulated electron trajectories 82. A diffuse arc is formed between the cathode tip and the anide ring and because of the magnetic field, extends considerably downstream from the electrodes themselves. It is believed that the electrons produced at the cathode travel some distance along the axis of the device before diffusing outward as shown. Where the plasma column 80 has expanded somewhat between magnets 14 and 16 as shown, it is believed that the electrons will drift left and right longitudinally as shown until they strike the anode, magnet coils or similarly placed obstacles. When all three spatial coordinates are considered this picture must be substantially modified to account for the action of the magnetic field, which has both a longitudinal and a radial component in the vicinity of the electrode assemblies. The radial component of the current will interact with the longitudinal component of the magnetic field to produce strong confining Hall currents which circulate around the axis of the device. These currents arise in the absence of a circumferential electric field because of the $J_r \times B_z$ interaction between the radial current density $J_r$ and the longitudinal magnetic field $B_z$, $\times$ representing the conventional vector cross product. These Hall currents are in the same direction as those noted previously in discussing the equilibrium in the central portion of the plasma column. The circumferential Hall currents interact in a similar manner with the radial component of the magnetic field to produce an axial acceleration away from the electrodes and with the axial component to produce a confining force. The axial plasma acceleration adjacent the electrodes is a further effective means of heating the plasma, since the kinetic energy of the plasma is converted into thermal energy by interparticle collision.

There is also an ion current formed at the anode which travels longitudinally away from the anode before diffusing towards the center of the plasma column and returning to the cathode. It is believed that the inward radial ionic flow in the general vicinity of the electrodes is compensated by a radially outward ionic flow in the portion of the plasma column remote from the electrodes, thus creating a form of ionic convection. It is believed that near the electrodes the ions carry the bulk of the current in the arc discharge because the plasma is not fully ionized and the ions are much more weakly coupled to the magnetic field than the electrons. This effect is enhanced by the mass injection or gas flow 84 which is supplied to the electrode assembly from gas source 46. Some of this gas is ionized by the arc discharge or by heat conducted from the plasma and contributes to the plasma. Some of the gas is not ionized and escapes from the plasma column in the manner indicated in FIGURE 3. This gas flow provides several important functions. One important function is simply that of cooling the electrodes. The gaseous atoms also collide with the plasma ions and further decouple them from the magnetic field. The gas flow also serves other and closely related important functions. In the absence of the gas flow the entire plasma column would be set into very rapid rotation by the electromagnetic torque and the resulting counter EMF between cathode and anode would then limit the flow of further current or energy into the system. On the other hand, the ion rotational frequency would approach the electron frequency thus reducing the net Hall currents and the resulting stabilizing and containing effect in the center of the column. Finally, under these conditions much of the plasma energy would be in the form of rotational kinetic energy rather than the desired thermal energy. The above mentioned gas flow carries off some of the angular momentum from the plasma column and thus acts as a brake or counter torque on the plasma column, particularly on the ions. This effect preserves the Hall current, thermalizes the ion kinetic energy and permits the plasma column to absorb energy from the arc current.

The torque acting on the plasma column is essentially the product of the magnetic field and the arc current. Assuming that the unionized gas reaches equilibrium with the plasma before escaping outward, the plasma angular velocity can be calculated as $BI/\dot{m}$ where $\dot{m}$ represents the total gas through-put from the external source 46 and I is the arc current at each electrode assembly. For small scale experiments as will be described hereafter, the plasma rotational velocity will be on the order of 1 million rotations/sec. As noted previously, this macroscopic plasma rotation is believed to have a significant effect in stabilizing the operation of the device. Finally, the gas flow establishes a pressure gradient away from the electrodes which helps to reduce heat losses from the plasma to the electrodes.

A brief theoretical analysis of the invention will be given later on. The analysis is not as complete as has been made on certain other plasma containment inventions, but the present invention is distinguished, among other things, from prior art devices in that it is capable of successful operation on a normal laboratory scale and has in fact been so operated. Of course, the analysis will show that with this invention as with others, containment efficiency and plasma temperature tends to rise as equipment is constructed on a larger scale and higher power inputs are employed.

The embodiments of FIGURES 1, 4 and 5 were tested using cylindrical magnet coils having dimensions of 3¼" long x 3" inside diameter and wound in such a way that in coils 13–20, 1 gauss was produced in the center of an isolated coil for each ampere of exciting current and in coils 16 and 18, 3 gauss were produced for each ampere. The electrode assemblies corresponded to those of FIGURE 2 and the internal diameter of the anode was 1.5 cm. Other types of coaxial electrode assemblies may be used. The approximate visual outline of the plasma column in each of these embodiments is illustrated in each of FIGURES 1, 4 and 5 by the dotted line 80. When hydrogen gas is used, the plasma column is nearly colorless with a sharply defined outer surface which is surrounded by a brilliant red glow believed due to atomic or molecular hydrogen. The entire discharge appears perfectly stable to the eye, but high speed motion pictures are suggestive of a filamentary structure with rapid small scale instabilities. FIGS. 1 and 4 are effective confinement configurations while FIG. 5 has regions of reduced magnetic field and is less effective. Of course, the shape of the plasma column will depend upon the current in the different magnet coils since the plasma column tends to follow the magnetic field configuration. Typical operating currents will be given in connection with FIGURES 6 to 9, but for the purpose of interpreting FIGURES 1, 4 and 5 a current of 2000 amperes per coil may be assumed.

The particular dimensions of the first, second and third embodiments are set forth below. In the first embodiment (FIG. 1), the faces of coils 14 and 16 and coils 18 and 20 were spaced 3 inches apart and the faces of coils 16 and 18 were spaced 1 inch apart. In the third embodiment (FIG. 5), the 3 inch spacing of the first embodiment was increased to 8 inches. In the second embodiment (FIG. 4), the coil face to coil face distances were 1½ inches. In each embodiment the face of anode 42 was recessed ¾ inch into end coils 14 and 20.

All experiments were performed generally as shown in FIGURE 1, except that in one experiment employing the configuration of FIGURE 1, a single electrode power supply 48 was employed and connected between a cathode 40 of electrode assembly 36 and anode 42 of the opposite electrode assembly 38. 1800 amps were applied to the end magnet coils 14 and 20 and 1300 amps to the center coils 16 and 18. The voltage of power supply 48 was 112 volts and 300 amps were delivered to the device. A plasma column was formed in this manner and a voltage of 58 volts was measured between the cathode of electrode assembly 36 and the electrically floating anode of the same electrode assembly. This clearly establishes the axial propagation of the radial electric field previously referred to and indicates that operation of the invention is possible with only one of electrode assemblies 36 and 38.

FIGURE 6 shows the plasma pressure as measured by a pressure gauge attached to an anode pressure tap 76 as a function of the arc current for both the first and second embodiments. In the first embodiment, the magnet currents were 1200 amperes in coils 14 and 20 and 1500 amperes in coils 16 and 18. The mass flow rate of hydrogen gas into the electrode was 0.02 gram/sec. In the second embodiment, the magnet current was 1200 amperes in coils 14 and 20 and, 1500 amperes in coils 16 and 18 and the mass flow rate was 0.05 gram/sec. The curves are not extended to zero arc current because the arc tends to become localized, unstable, and destructive at low currents whereas at higher currents a steady, stable, non-destructive discharge can be obtained. The curves are linear and would pass through the origin if extended, thus suggesting that any arbitrary plasma pressure could be obtained by adjusting the arc current to an appropriate value. Such indefinite extrapolation is not possible, however, because the quantity $B^2/2N°$ is known to be an absolute upper limit on the plasma pressure that can be contained with a given magnetic field. It is presently believed desirable to minimize the plasma rotational kinetic energy by adjusting the magnetic field so that the magnetic pressure $B^2/2N°$ does not greatly exceed the actual pressure.

FIGURE 7 shows the effect, in the first embodiment of increasing the current through center magnet coils 16 and 18 while maintaining the current in coils 14 and 20 fixed at 1500 amps and the arc current at 300 amperes each.

It is apparent that the presence of a strong continuous magnetic field in the region between the two electrode assemblies is an important factor in the confinement of the plasma, as is supported by the theoretical interpretations previously given. Visual observations confirm that the plasma column expands in diameter in the center of the apparatus as the current is reduced in magnet coils 16 and 18. In each of FIGURES 6 and 7, the background pressure in chamber 10 was generally from less than 0.1 millimeter of mercury to a maximum value of approximately 0.2 mm. of mercury Thus, as shown in FIGURE 6, the embodiment of FIGURE 4 achieved a pressure ratio of approximately 200:1 between the pressure in the plasma column and the background pressure in chamber 10. Similar pressure measurements were obtained at both the cathode and anode pressure taps of each of electrode assemblies 36 and 38.

FIGURE 8 shows the effect in the first embodiment of varying the mass flow rate while maintaining the arc current constant at 300 amps and 120 volts and the magnet current constant at 1500 amperes in coils 14 and 20 and 1200 amperes in coils 16 and 18. One curve shows the pressure of the plasma column itself and the other curve shows the ratio of the plasma column pressure to the chamber background pressure. The plasma column pressure increases with the rate at which gas is introduced, but saturates at a definite flow rate and pressure value in this particular embodiment. The pressure ratio is optimized at a particular flow rate because increasing the flow rate raises the background pressure due to the finite pumping capacity of the vacuum pump 12.

FIGURE 9 shows the power dissipated in anode 42 as a function of the arc current. The configuration was that of FIGURE 1 with mass flow and magnet currents as in FIG. 8. The anode power dissipation was measured in terms of the cooling water flow rate and temperature rise. The slope of the curve is the ratio of a power to a current and accordingly has the dimensions of a voltage. The slope is 100 volts and this can be interpreted as a measure of the energy of the plasma electrons collected at the anode and is therefore a measure of the plasma temperature. It is apparent, therefore, that increasing the field in the central part of the device of the invention not only increases the plasma pressure but also greatly increases the plasma temperature. Heat flow measurements also show that most of the plasma energy is dissipated to the anodes and magnets and very little to chamber 10, thus confirming the efficiency of the confinement mechanism.

Theoretical calculations indicate that the maximum temperature which can be obtained in a double ended configuration is given by:

$$T_{max} = \left\{ \frac{9}{4\pi^2(.72)} \left( \frac{kT^{5/2}}{|e|K} \right) \frac{LI}{R^2} [1-q^*] \right\}^{2/5}$$

where:
$k$ = Gas constant
$|e|$ = Charge on electron
$T$ = Temperature
$K$ = Thermal conductivity (parallel to B)
$L$ = Length of device (cathode to cathode)
$R$ = Radius of plasma column
$I$ = Electric current In this equation, $q^*$ is the percent of the power radiated and is given by:

$$q^* = \frac{B^2 R^2 (1+\Psi)}{3} \left( \frac{\sigma Q r}{p^2} \right)$$

where:
$B$ = Magnetic field strength
$\sigma$ = Electrical conductivity
$P$ = Pressure
$Q$ = Bremsstrahlung radiation
$m_a$ = Mass of ion
$\dot{m}$ = Mass flow rate where $$\Psi = \frac{|e|\dot{m}}{m_a I}$$

the ratio of mass flow rate in amperes divided by the electric current.

Numbers can be assigned to the plasma properties as follows: (MKS units)

$$\frac{kT^{5/2}}{|e|K} = 1.82 \times 10^6$$

$$\frac{\sigma Q_r}{p^2} = 203$$

The temperature equation can now be written as:

$$T_{max} = \left\{ 5.77 \times 10^5 \frac{LI}{R^2} [1 - 68 B^2 R^2 (1\Psi)] \right\}^{2/5} \circ_K$$

This equation reflects the fact that the Hall currents essentially cancel the magnetic field in the hot high density core of the plasma column so that the cyclotron radiation losses, which are usually a major factor in plasma containment devices, are minimal compared to the Bremsstrahlung losses.

The pressure that can be attained is given by:

$$p_{max} = \frac{3\sqrt{3}}{2\pi^2} \sqrt{(1+\Psi)(1-q^*)} \frac{BI}{R} \left( \frac{k^2 \sigma T}{|e|^2 K} \right)^{1/2}$$

$$\frac{K}{\sigma T} = \text{Lorenz number for plasma}$$

$$\frac{|e|^2 K}{k^2 \sigma T} = 4.73$$

The pressure equation can now be written as:

$$p_{max} = 0.121 \sqrt{(1+\Psi)\{1 - 68 B^2 R^2 (1+\Psi)\}} \frac{BI}{R} \frac{\text{newtons}}{\text{meter}^2}$$

The power conducted to the anode, exclusive of the work function energy is:

$$P_A = \frac{(.72)\pi R^2}{L} \left( \frac{K}{T^{5/2}} \right) T_{max}^{5/2}$$

$$\frac{K}{T^{5/2}} = 4.73 \times 10^{-11}$$

The power equation can now be written as:

$$P_A = 1.07 \times 10^{-10} \frac{R^2}{L} T_{max}^{7/2} \text{ watts}$$

Any gas or gasifiable material may be used to form the plasma, depending on the intended use of the plasma. Where neutron generation or power production is intended a hydrogenic gas will be used, particularly deuterium or tritium or mixtures thereof. Although a theory of operation has been proposed, the invention is not predicated on the validity of the theory, since operability is a demonstrated fact. Furthermore, it appears likely that the theoretical mechanism of operation may vary under different operating conditions. Many variations may be made to the described embodiments without departing from the novel concept of the invention. Thus, complete symmetry about a linear axis is preferred, but departures from this symmetry can be tolerated and the "axis" itself can be curved since the discharge will follow the magnetic field whether straight or not. The magnet coils can, other than solenoid or cylindrical, be wound on conical forms or the like, and permanent magnets may be used within the limits of their technology. It is also possible to use an alternating magnetic field provided the frequency $f$ is high enough so that the period $1/f$ is small compared to the average resistance time of an ion in the plasma column. This represents another mechanism for introducing energy into the plasma. Other variations in size, configuration, operating conditions and the like are encompassed by the invention as defined in the claims:

What is claimed is:
1. The method of electromagnetically containing a body of high temperature plasma in which the magnetic field, temperature and plasma density are so related that $2\pi\omega_e\tau_e$ is greater than 1, $\omega_e$ being the angular cyclotron frequency for electrons and $\tau_e$ being the mean time between collisions for electrons comprising:
    establishing a longitudinally continuous magnetic field substantially symmetrical about a line, and
    maintaining two electrical discharges within said magnetic field substantially symmetrical about said line, the outside of said discharges being positive with respect to the inside.
2. The method of claim 1 in which the radius of said discharges is maintained small than the cyclotron radius for ions.
3. The method of claim 1 further including the step of imparting a macroscopic rotation to said body of plasma about said axis.
4. The method of claim 1 including the step of supplying an ionizable gas to said discharges.
5. The method of claim 1 including maintaining a flow of ionizable gas to said discharges and maintaining the radius of said discharges less than the cyclotron radius for ions in said discharge.

6. The method of claim 1 including the step of forming in said magnetic field at least two regions of locally increased field strength and of locating said discharges in said regions.

7. Plasma containment apparatus comprising:
a chamber,
means to evacuate said chamber,
magnetic means to form a longitudinally continuous magnetic field strong enough to maintain $2\pi\omega_e\tau_e$ greater than 1 where $\omega_e$ is the angular frequency of the electron cyclotron oscillation and $\tau_e$ is the mean time between electron collisions along a line within said chamber,
a pair of opposed plasma arc generators disposed within said magnetic field on said line and substantially symmetrical thereabout, each generator comprising a central cathode electrode and an anode electrode encircling said cathode, each said generator including at least one passage terminating between said cathode and anode,
gas supply means to introduce a plasma forming a gas through said passages and,
power supply means to maintain an arc discharge between said anodes and said cathodes.

8. The apparatus of claim 7 in which said anode electrodes have a diameter less than the diameter of ion cyclotron oscillations in said chamber.

9. The apparatus of claim 7 in which the magnetic means creates a magnetic containment pressure greater than but of the same order of magnitude as the plasma contained in said apparatus.

References Cited

UNITED STATES PATENTS

| 3,104,345 | 9/1963 | Wilcox et al. | 313—161 X |
| 3,209,189 | 9/1965 | Patrick | 313—231 X |
| 3,230,418 | 1/1966 | Dandl et al. | 313—161 X |

JAMES W. LAWRENCE, *Primary Examiner.*

R. F. HOOSFELD, *Assistant Examiner.*

U.S. Cl. X.R.

176—7; 313—161, 231